US010382997B2

(12) United States Patent
Wang

(10) Patent No.: US 10,382,997 B2
(45) Date of Patent: Aug. 13, 2019

(54) USER EQUIPMENT MIGRATION METHOD, CORE NETWORK DEVICE, ACCESS NETWORK DEVICE, AND SYSTEM

(71) Applicant: Huawei Technologies Co., Ltd., Shenzhen (CN)

(72) Inventor: Hai Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 15/664,755

(22) Filed: Jul. 31, 2017

(65) Prior Publication Data

US 2017/0332269 A1 Nov. 16, 2017

Related U.S. Application Data

(63) Continuation of application No. PCT/CN2015/072063, filed on Jan. 31, 2015.

(51) Int. Cl.
*H04W 36/18* (2009.01)
*H04W 28/02* (2009.01)
(Continued)

(52) U.S. Cl.
CPC ........... *H04W 28/02* (2013.01); *H04W 8/065* (2013.01); *H04W 28/08* (2013.01); *H04W 48/18* (2013.01); *H04W 8/12* (2013.01); *H04W 36/12* (2013.01)

(58) Field of Classification Search
CPC ..... H04W 28/02; H04W 36/12; H04W 48/18; H04W 8/12
See application file for complete search history.

(56) References Cited

U.S. PATENT DOCUMENTS

2011/0116477 A1* 5/2011 Wu ................... H04L 63/104
370/331
2011/0122845 A1 5/2011 Meirosu et al.
(Continued)

FOREIGN PATENT DOCUMENTS

CN 101039506 A 9/2007
CN 101291536 A 10/2008
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 10)," 3GPP TS 23.401, V10.13.0, pp. 1-278, XP051294041, 3rd Generation Partnership Project, Valbonne, France (Dec. 2014).

*Primary Examiner* — Mohamed A Kamara
(74) *Attorney, Agent, or Firm* — Leydig, Voit & Mayer, Ltd.

(57) ABSTRACT

The embodiments of the present invention disclose a user equipment migration method and device to implement flexible migration of UE in a core network device pool. The method includes that a source core network device receives a migration instruction carrying first identification information of a target core network device and migration information of to-be-migrated UE, sends an indication message used to instruct the to-be-migrated UE to detach, and sends a migration rule to an access network device according to the migration instruction, so that the access network device migrates the to-be-migrated UE from the source core network device to the target core network device.

18 Claims, 4 Drawing Sheets

(51) Int. Cl.
*H04W 8/06* (2009.01)
*H04W 28/08* (2009.01)
*H04W 48/18* (2009.01)
*H04W 8/12* (2009.01)
*H04W 36/12* (2009.01)

(56) References Cited

U.S. PATENT DOCUMENTS

| | | | |
|---|---|---|---|
| 2011/0305221 A1* | 12/2011 | Wang | H04W 36/0033 370/331 |
| 2013/0183971 A1 | 7/2013 | Tamaki et al. | |
| 2013/0231115 A1 | 9/2013 | Lin | |
| 2014/0226615 A1 | 8/2014 | Beale | |
| 2014/0341140 A1 | 11/2014 | Beale | |
| 2015/0078173 A1* | 3/2015 | Javed | H04W 24/08 370/241 |
| 2015/0237546 A1 | 8/2015 | Lin | |
| 2017/0251357 A1* | 8/2017 | Iwai | H04W 8/08 |

FOREIGN PATENT DOCUMENTS

| | | |
|---|---|---|
| CN | 101583155 A | 11/2009 |
| CN | 102457918 A | 5/2012 |
| CN | 103733683 A | 4/2014 |
| CN | 103828423 A | 5/2014 |
| KR | 20150005408 A | 1/2015 |

\* cited by examiner

USER EQUIPMENT MIGRATION METHOD, CORE NETWORK DEVICE, ACCESS NETWORK DEVICE, AND SYSTEM

CROSS-REFERENCE TO RELATED APPLICATIONS

This application is a continuation of International Application No. PCT/CN2015/072063, filed on Jan. 31, 2015, the disclosure of which is hereby incorporated by reference in its entirety.

TECHNICAL FIELD

The embodiments of the present invention relate to the field of communications technologies, and in particular, to a user equipment migration method, a core network device, an access network device, and a system.

BACKGROUND

A Mobility Management Entity (MME) pool is a network element deployment manner that is defined by a 3rd Generation Partnership Project (3GPP) protocol and that is used for redundancy and reliability. Multiple MMEs concurrently run in the MME pool, and share services in the MME pool. The MMEs in the pool interconnect with all evolved NodeBs (eNB) that are in the MME pool, and all the MMEs in the pool can share resources, thereby sharing service load.

In the conventional art, an eNB obtains load weights of MMEs, and selects, according to the load weights, an MME to be accessing user equipment (UE). That is, in the conventional art, an MME which UE is to access is selected based on load, and consequently flexible migration of the UE in an MME pool cannot be implemented.

SUMMARY

The embodiments of the present invention provide a user equipment migration method, a core network device, an access network device and a system, to implement flexible migration of UE in a core network device pool.

According to a first aspect, an embodiment of the present invention provides a core network device, including:

a receiving module, configured to receive a migration instruction sent by a core network management device, where the migration instruction carries first identification information of a target core network device and migration information of to-be-migrated UE;

a sending module, configured to send, according to the migration information of the to-be-migrated UE that is received by the receiving module, an indication message used to instruct the to-be-migrated UE to detach, to the to-be-migrated UE; and send a migration rule to an access network device according to the migration instruction received by the receiving module, so that the access network device migrates, according to the migration rule, the to-be-migrated UE from the source core network device to the target core network device, where the migration rule includes identification information of the source core network device and second identification information of the target core network device.

With reference to the first aspect, in a first possible implementation manner of the first aspect, the migration instruction or the migration rule further includes:

a correspondence between the to-be-migrated UE and the target core network device; or a correspondence between the source core network device and the target core network device.

With reference to the first aspect or the first possible implementation manner of the first aspect, in a second possible implementation manner of the first aspect, the migration information includes at least one of the following: a quantity of the to-be-migrated UEs, a percentage of the quantity of the to-be-migrated UEs in a total quantity of all UEs accessing the source core network device, a percentage of the quantity of the to-be-migrated UEs in a quantity of UEs accessing a base station to which the to-be-migrated UEs belong, identification information of the base station to which the to-be-migrated UEs belong, or identification information of the to-be-migrated UEs.

With reference to the second possible implementation manner of the first aspect, in a third possible implementation manner of the first aspect, the core network device further includes:

a determining module, configured to: when the migration information includes the quantity of the to-be-migrated UEs, select, according to the quantity of the to-be-migrated UEs, a corresponding quantity of UEs from all the UEs accessing the source core network device, as the to-be-migrated UEs; or, when the migration information includes the percentage of the quantity of the to-be-migrated UEs in the total quantity of all the UEs accessing the source core network device, select, according to the percentage, UEs corresponding to the percentage from all the UEs accessing the source core network device, as the to-be-migrated UEs; or, when the migration information includes the identification information of the base station to which the to-be-migrated UEs belong, select all the UEs accessing the base station to which the to-be-migrated UEs belong, as the to-be-migrated UEs, where the sending module is specifically configured to send the indication message to the to-be-migrated UEs determined by the determining module.

With reference to any one of the first aspect or the first possible implementation manner to the third possible implementation manner of the first aspect, in a fourth possible implementation manner of the first aspect, the migration rule sent by the sending module to the access network device further includes at least one of the following: a migration start time, a migration end time, or identification information of the to-be-migrated UE, where the migration start time is used to instruct the access network device to start to migrate the to-be-migrated UE when the migration start time arrives; the migration end time is used to instruct the access network device to stop migrating the to-be-migrated UE when the migration end time arrives; and the identification information of the to-be-migrated UE is used to indicate the to-be-migrated UE.

With reference to any one of the first aspect or the first possible implementation manner to the fourth possible implementation manner of the first aspect, in a fifth possible implementation manner of the first aspect, the sending module is specifically configured to send a migration request message to the access network device, where the migration request carries the migration rule.

With reference to the fifth possible implementation manner of the first aspect, in a sixth possible implementation manner of the first aspect, the receiving module is further configured to receive, after the sending module sends the migration request message to the access network device, a migration response message with which the access network device replies according to the received migration request message.

With reference to any one of the first aspect or the first possible implementation manner to the sixth possible implementation manner of the first aspect, in a seventh possible implementation manner of the first aspect, the migration instruction further includes a migration speed; and the sending module is specifically configured to send, according to the migration information of the to-be-migrated UE, the indication message used to instruct the to-be-migrated UE to detach, to the to-be-migrated UE at the migration speed.

According to a second aspect, an embodiment of the present invention further provides an access network device, including:

a receiving module, configured to receive a migration rule sent by a source core network device, where the migration rule includes identification information of a target core network device and identification information of the source core network device; and a migration module, configured to migrate, according to the migration rule received by the receiving module, the to-be-migrated UE from the source core network device to the target core network device.

With reference to the second aspect, in a first possible implementation manner of the second aspect, the receiving module is further configured to receive an access request message sent by the to-be-migrated UE before the migration module migrates, according to the migration rule, the to-be-migrated UE from the source core network device to the target core network device, where the access request message carries identification information of a core network device to which the to-be-migrated UE is connected; and the access network device further includes:

a first determining module, configured to: if determining that the identification information of the core network device to which the to-be-migrated UE is connected and the identification information of the source core network device are the same, instruct the migration module to migrate, according to the migration rule received by the receiving module, the to-be-migrated UE from the source core network device to the target core network device.

With reference to the second aspect or the first possible implementation manner of the first aspect, in a second possible implementation manner of the second aspect, the migration rule further includes:

a correspondence between the to-be-migrated UE and the target core network device; or a correspondence between the source core network device and the target core network device.

With reference to the second possible implementation manner of the second aspect, in a third possible implementation manner of the second aspect, the access network device further includes:

a second determining module, configured to determine the target core network device of the to-be-migrated UE according to the correspondence between the to-be-migrated UE and the target core network device or the correspondence between the source core network device and the target core network device, where the migration module is specifically configured to migrate the to-be-migrated UE to the target core network device of the to-be-migrated UE that is determined by the second determining module.

With reference to any one of the second aspect or the first possible implementation manner to the third possible implementation manner of the second aspect, in a fourth possible implementation manner of the second aspect, the migration rule further includes at least one of the following: a migration start time, a migration end time, or identification information of the to-be-migrated UE; and the migration module is specifically configured to: when the migration rule further includes the migration start time, and when the migration start time arrives, start to migrate the to-be-migrated UE from the source core network device to the target core network device; or when the migration rule further includes the migration end time, and when the migration end time arrives, stop migrating the to-be-migrated UE from the source core network device to the target core network device.

With reference to any one of the second aspect or the first possible implementation manner to the fourth possible implementation manner of the second aspect, in a fifth possible implementation manner of the second aspect, the receiving module is specifically configured to receive a migration request message sent by the source core network device, where the migration request carries the migration rule; and the access network device further includes:

a sending module, configured to send a migration request response message to the source core network device, where the migration request response message is configured to indicate that the receiving module successfully receives the migration request message.

With reference to any one of the second aspect or the first possible implementation manner to the fifth possible implementation manner of the second aspect, in a sixth possible implementation manner of the second aspect, the access network device further includes:

a third determining module, configured to determine whether the migrating the to-be-migrated UE from the source core network device to the target core network device is finished; and a clear module, configured to clear the migration rule if the third determining module determines that the migrating the to-be-migrated UE from the source core network device to the target core network device is finished.

With reference to the sixth possible implementation manner of the second aspect, in a seventh possible implementation manner of the second aspect, the third determining module is specifically configured to:

if the receiving module receives a migration end instruction sent by the target core network device, determine that the migrating the to-be-migrated UE from the source core network device to the target core network device is finished; or if it is determined that a current time reaches the migration end time included in the migration rule, determine that the migrating the to-be-migrated UE from the source core network device to the target core network device is finished.

According to a third aspect, an embodiment of the present invention further provides a user equipment migration system, including:

the core network device according to any one of the first aspect or the first possible implementation manner to the seventh possible implementation manner of the first aspect;

the access network device according to any one of the second aspect or the first possible implementation manner to the seventh possible implementation manner of the second aspect; and a core network management device, configured to: determine migration information of to-be-migrated UE and first identification information of a target core network device; and send, to the core network device, a migration instruction that carries the determined migration information of the to-be-migrated UE and first identification information of the target core network device.

According to a fourth aspect, an embodiment of the present invention provides a user equipment migration method, including:

receiving, by a source core network device, a migration instruction sent by a core network management device, where the migration instruction carries first identification information of a target core network device and migration information of to-be-migrated UE;

sending, by the source core network device according to the migration information of the to-be-migrated UE, an indication message used to instruct the to-be-migrated UE to detach, to the to-be-migrated UE; and sending, by the source core network device, a migration rule to an access network device according to the migration instruction, so that the access network device migrates, according to the migration rule, the to-be-migrated UE from the source core network device to the target core network device, where the migration rule includes identification information of the source core network device and second identification information of the target core network device.

With reference to the fourth aspect, in a first possible implementation manner of the fourth aspect, the migration instruction or the migration rule further includes:

a correspondence between the to-be-migrated UE and the target core network device; or a correspondence between the source core network device and the target core network device.

With reference to the fourth aspect or the first possible implementation manner of the fourth aspect, in a second possible implementation manner of the fourth aspect, the migration information includes at least one of the following: a quantity of the to-be-migrated UEs, a percentage of the quantity of the to-be-migrated UEs in a total quantity of all UEs accessing the source core network device, a percentage of the quantity of the to-be-migrated UEs in a quantity of UEs accessing a base station to which the to-be-migrated UEs belong, identification information of the base station to which the to-be-migrated UEs belong, or identification information of the to-be-migrated UEs.

With reference to the second possible implementation manner of the fourth aspect, in a third possible implementation manner of the fourth aspect, the sending, by the source core network device according to the migration information of the to-be-migrated UE, an indication message used to instruct the to-be-migrated UE to detach, to the to-be-migrated UE includes:

when the migration information includes the quantity of the to-be-migrated UEs, selecting, by the source core network device according to the quantity of the to-be-migrated UEs, a corresponding quantity of UEs from all the UEs accessing the source core network device, as the to-be-migrated UEs; or, when the migration information includes the percentage of the quantity of the to-be-migrated UEs in the total quantity of all the UEs accessing the source core network device, selecting, by the source core network device according to the percentage, UEs corresponding to the percentage from all the UEs accessing the source core network device, as the to-be-migrated UEs; or, when the migration information includes the identification information of the base station to which the to-be-migrated UEs belong, selecting all the UEs accessing the base station to which the to-be-migrated UEs belong, as the to-be-migrated UEs; and sending, by the source core network device, the indication message to the to-be-migrated UEs.

With reference to any one of the fourth aspect or the first possible implementation manner to the third possible implementation manner of the fourth aspect, in a fourth possible implementation manner of the fourth aspect, the migration rule further includes at least one of the following: a migration start time, a migration end time, or identification information of the to-be-migrated UE; and the migration start time is used to instruct the access network device to start to migrate the to-be-migrated UE when the migration start time arrives; the migration end time is used to instruct the access network device to stop migrating the to-be-migrated UE when the migration end time arrives; and the identification information of the to-be-migrated UE is used to indicate the to-be-migrated UE.

With reference to any one of the fourth aspect or the first possible implementation manner to the fourth possible implementation manner of the fourth aspect, in a fifth possible implementation manner of the fourth aspect, the sending, by the source core network device, a migration rule to an access network device includes:

sending, by the source core network device, a migration request message to the access network device, where the migration request carries the migration rule.

With reference to the fifth possible implementation manner of the fourth aspect, in a sixth possible implementation manner of the fourth aspect, after the sending, by the source core network device, a migration request message to the access network device, the method further includes:

receiving, by the source core network device, a migration response message with which the access network device replies according to the received migration request message.

With reference to any one of the fourth aspect or the first possible implementation manner to the sixth possible implementation manner of the fourth aspect, in a seventh possible implementation manner of the fourth aspect, the migration instruction further includes a migration speed; and the sending, by the source core network device according to the migration information of the to-be-migrated UE, an indication message used to instruct the to-be-migrated UE to detach, to the to-be-migrated UE includes:

sending, by the source core network device according to the migration information of the to-be-migrated UE, the indication message used to instruct the to-be-migrated UE to detach, to the to-be-migrated UE at the migration speed.

According to a fifth aspect, an embodiment of the present invention provides a user equipment migration method, including:

receiving, by an access network device, a migration rule sent by a source core network device, where the migration rule includes identification information of a target core network device and identification information of the source core network device; and migrating, by the access network device according to the migration rule, to-be-migrated UE from the source core network device to the target core network device.

With reference to the fifth aspect, in a first possible implementation manner of the fifth aspect, before the migrating, by the access network device according to the migration rule, to-be-migrated UE from the source core network device to the target core network device, the method further includes:

receiving, by the access network device, an access request message sent by the to-be-migrated UE, where the access request message carries identification information of a core network device to which the to-be-migrated UE is connected; and if it is determined that the identification information of the core network device to which the to-be-migrated UE is connected and the identification information of the source core network device are the same, migrating, by the access network device according to the migration rule, the to-be-migrated UE from the source core network device to the target core network device.

With reference to the fifth aspect or the first possible implementation manner of the fifth aspect, in a second possible implementation manner of the fifth aspect, the migration rule further includes:

a correspondence between the to-be-migrated UE and the target core network device; or a correspondence between the source core network device and the target core network device.

With reference to the second possible implementation manner of the fifth aspect, in a third possible implementation manner of the fifth aspect, the migrating, according to the migration rule, the to-be-migrated UE from the source core network device to the target core network device includes:

determining, by the access network device, the target core network device of the to-be-migrated UE according to the correspondence between the to-be-migrated UE and the target core network device or the correspondence between the source core network device and the target core network device; and migrating the to-be-migrated UE to the determined target core network device of the to-be-migrated UE.

With reference to any one of the fifth aspect or the first possible implementation manner to the third possible implementation manner of the fifth aspect, in a fourth possible implementation manner of the fifth aspect, the migration rule further includes at least one of the following: a migration start time, a migration end time, or identification information of the to-be-migrated UE; and the migrating, by the access network device according to the migration rule, the to-be-migrated UE from the source core network device to the target core network device includes:

when the migration rule further includes the migration start time, and when the migration start time arrives, starting, by the access network device, to migrate the to-be-migrated UE from the source core network device to the target core network device; or when the migration rule further includes the migration end time, and when the migration end time arrives, stopping, by the access network device, migrating the to-be-migrated UE from the source core network device to the target core network device.

With reference to any one of the fifth aspect or the first possible implementation manner to the fourth possible implementation manner of the fifth aspect, in a fifth possible implementation manner of the fifth aspect, the receiving, by an access network device, a migration rule sent by a source core network device includes:

receiving, by the access network device, a migration request message sent by the source core network device, where the migration request carries the migration rule; and the method further includes:

sending, by the access network device, a migration request response message to the source core network device, where the migration request response message is used to indicate that the access network device successfully obtains the migration request message.

With reference to any one of the fifth aspect or the first possible implementation manner to the fifth possible implementation manner of the fifth aspect, in a sixth possible implementation manner of the fifth aspect, the method further includes:

if the access network device determines that the migrating the to-be-migrated UE from the source core network device to the target core network device is finished, clearing the migration rule.

With reference to the sixth possible implementation manner of the fifth aspect, in a seventh possible implementation manner of the fifth aspect, the determining, by the access network device, that the migrating the to-be-migrated UE from the source core network device to the target core network device is finished includes:

if the access network device receives a migration end instruction sent by the target core network device, determining, by the access network device, that the migrating the to-be-migrated UE from the source core network device to the target core network device is finished; or if a current time reaches the migration end time included in the migration rule, determining, by the access network device, that the migrating the to-be-migrated UE from the source core network device to the target core network device is finished.

According to the solutions provided in the embodiments of the present invention, a core network management device sends a migration instruction to a source core network device, to provide migration information of to-be-migrated UE and identification information of a target core network device, and the source core network device generates a migration rule according to the migration instruction, and sends the migration rule to an access network device, so that the access network device migrates the to-be-migrated UE according to the migration rule, thereby implementing flexible designation of the to-be-migrated UE and the target core network device, and further implementing flexible migration of the UE between the core network devices.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G, 3G, and 4G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, and other communications systems.

Embodiments of the present invention provide a user equipment migration method, a core network device, an access network device, and a system. The method, devices, and system are based on a same inventive concept. Because the method, devices, and system have similar principles of resolving problems, cross reference may be made for implementation of the system, devices, and method, and repetitions are not described. The "and/or" used in the embodiments of the present invention is not only a relationship of "and", but also a relationship of "or". For example, A and/or B may represent: Only A exists, only B exists, and both A and B exist.

Figure 1:
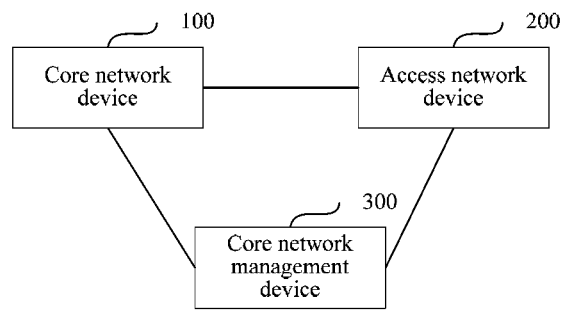
FIG. 1 is a schematic diagram of a user equipment migration system according to an embodiment of the present invention provides.

An embodiment of the present invention provides a user equipment migration system. As shown in FIG. 1, the system includes: a core network device 100, an access network device 200, and a core network management device 300.

The core network device 100 includes at least a source core network device 100a and a target core network device 100b. The core network device 100 may be an MME or a serving general packet radio service support node (SGSN). The access network device 200 may be a base station or a base station control device, for example, a base station controller (BSC), or a radio network controller (RNC). The core network management device 300 may be an element management system (EMS), or may be another device that is configured to manage the core network device and that is other than an element management system. This is not specifically limited in this embodiment of the present invention. In addition, the core network management device 300 may include one or more network devices.

The core network management device 300 determines migration information of to-be-migrated UE and first identification information of the target core network device 100b; and sends, to the source core network device 100a, a migration instruction that carries the determined migration information of the to-be-migrated UE and first identification information of the target core network device 100b.

The core network management device 300 obtains a quantity of to-be-migrated UEs or a proportion of the to-be-migrated UEs, and the target core network device 100b. The proportion of the to-be-migrated UEs may be a percentage of the quantity of the to-be-migrated UEs in a total quantity of UEs accessing the core network device 100 that is managed by the core network management device 300, or a percentage of the quantity of the to-be-migrated UEs in a total quantity of UEs accessing the source core network device 100a. Specifically, in this embodiment of the present invention, the source core network device 100a may be designated, or may not be designated, and there may be one or more source core network devices 100a.

If there are multiple source core network devices 100a, the core network management device 300 divides the obtained quantity of to-be-migrated UEs or the obtained proportion of to-be-migrated UEs, performs allocation to each source core network device 100a, determines a quantity of to-be-migrated UEs or a proportion of to-be-migrated UEs that are to be allocated to each source core network device 100a, and sends the quantity or proportion to each source core network device 100a by using a migration instruction. The determined quantity of to-be-migrated UEs or the determined proportion of to-be-migrated UEs is migration information of the to-be-migrated UEs.

The foregoing obtained information may be set for the core network management device 300 by an operator by using a human-machine interface device, or may be preset in the core network management device 300 by an operator. This is not specifically limited in this embodiment of the present invention. There may be one or more target core network devices 100b.

Optionally, the migration instruction may further include at least one of the following: a migration start time, a migration end time, or identification information of the to-be-migrated UE. The migration instruction may be a new S1 interface message, or may be carried in an original S1 interface message.

Figure 2:
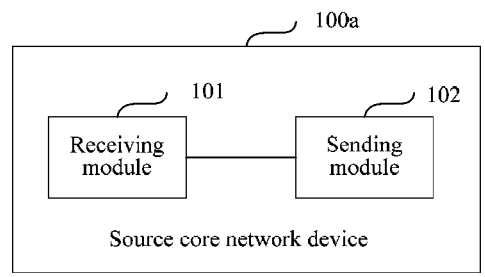
FIG. 2 is a schematic diagram of a core network device according to an embodiment of the present invention.

For a core network device (including a source core network device 100a and a target core network device 100b) provided in an embodiment of the present invention, as shown in FIG. 2, the source core network device 100a is used as an example for description. The source core network device 100a may be configured to perform a method shown in FIG. 4 or FIG. 5, and may specifically include a receiving module 101 and a sending module 102.

The receiving module 101 is configured to receive a migration instruction sent by a core network management device 300, where the migration instruction carries first identification information of the target core network device 100b and migration information of to-be-migrated UE.

The migration information of the to-be-migrated UE may include at least one of the following: a quantity of the to-be-migrated UEs, a percentage of the quantity of the to-be-migrated UEs in a total quantity of all UEs accessing the source core network device 100a, a percentage of the quantity of the to-be-migrated UEs in a quantity of UEs accessing a base station to which the to-be-migrated UEs belong, identification information of the base station to which the to-be-migrated UEs belong, or identification information of the to-be-migrated UEs.

Specifically, the identification information of the to-be-migrated UE is used to indicate the to-be-migrated UE, and may be an International Mobile Subscriber Identity (IMSI) of the to-be-migrated UE, a Mobile Station international Integrated Services Digital Network (MSISDN) number of the to-be-migrated UE, a level of the to-be-migrated UE, a type of the to-be-migrated UE, subscription information of the to-be-migrated UE, or the like.

Further, the migration instruction further includes: a correspondence between the to-be-migrated UE and the target core network device 100b; or a correspondence between the source core network device 100a and the target core network device 100b. Specifically, the correspondence may be stored in form of a table, or may be stored by associating identification information of to-be-migrated UE with identification information of each target core network device 100*b*, or the like.

The migration rule sent by the sending module 102 to the access network device 200 further includes: a correspondence between the to-be-migrated UE and the target core network device 100*b*; or, a correspondence between the source core network device 100*a* and the target core network device 100*b*.

The sending module 102 is configured to send, according to the migration information of the to-be-migrated UE that is received by the receiving module 101, an indication message used to instruct the to-be-migrated UE to detach, to the to-be-migrated UE; and send a migration rule to the access network device 200 according to the migration instruction received by the receiving module 101, so that the access network device 200 migrates, according to the migration rule, the to-be-migrated UE from the source core network device 100*a* to the target core network device 100*b*, where the migration rule includes identification information of the source core network device 100*a* and second identification information of the target core network device 100*b*.

The indication message used to instruct the to-be-migrated UE to detach may be a detach message, or may be a UE context release command message, or the like.

Specifically, when the sending module 102 of the source core network device 100*a* sends the migration rule to each access network device that is accessing the source core network device 100*a*, the sending module carries the migration rule in a migration request message and sends the migration rule to each access network device that is accessing the sending module.

It should be noted that, the second identification information of the target core network device 100*b* and the first identification information of the target core network device 100*b* may be the same, or may be different. For example, the second identification information may be obtained according to the first identification information of the target core network device 100*b*. This is not limited herein.

Optionally, the migration instruction may further include at least one of the following: a migration start time, a migration end time, a migration speed, or identification information of the to-be-migrated UE. The migration instruction may be a new S1 interface message, or may be carried in an original S1 interface message.

The migration start time is used to instruct the access network device 200 to start to migrate the to-be-migrated UE when the migration start time arrives; the migration end time is used to instruct the access network device 200 to stop migrating the to-be-migrated UE when the migration end time arrives; and the identification information of the to-be-migrated UE is used to indicate the to-be-migrated UE. The migration speed is used to instruct the sending module 102 to send an indication message used to instruct the to-be-migrated UE to detach to the to-be-migrated UE at the migration speed.

When the migration instruction includes the migration start time and/or the migration end time, the migration start time and/or the migration end time may be carried in the migration rule and sent to the access network device 200.

Certainly, the migration start time and the migration end time may further be determined by the source core network device 100*a*, and then carried in the migration rule and sent to the access network device 200.

In the solution provided in the foregoing embodiment, the core network management device 300 sends a migration instruction to the source core network device 100*a*, to provide migration information of the to-be-migrated UE and identification information of the target core network device 100*b*; the source core network device 100*a* sends a migration rule to the access network device 200 according to the migration instruction, thereby implementing flexible designation of the to-be-migrated UE and the target core network device 100*b*, and further implementing flexible migration of the UE between the core network devices.

Optionally, the source core network device 100 further includes:

a determining module, configured to: when the migration information includes the quantity of the to-be-migrated UEs, select, according to the quantity of the to-be-migrated UEs, a corresponding quantity of UEs from all UEs accessing the source core network device 100*a*, as the to-be-migrated UEs; or, when the migration information includes the percentage of the quantity of the to-be-migrated UEs in the total quantity of all the UEs accessing the source core network device 100*a*, select, according to the percentage, UEs corresponding to the percentage from all the UEs accessing the source core network device 100*a*, as the to-be-migrated UEs; or, when the migration information includes the identification information of the base station to which the to-be-migrated UEs belong, select all the UEs accessing the base station to which the to-be-migrated UEs belong, as the to-be-migrated UEs; and the sending module 102 is specifically configured to send the indication message to the to-be-migrated UEs determined by the determining module.

Optionally, the sending module 102 is specifically configured to send a migration request message to the access network device 200, where the migration request carries the migration rule.

Further, the receiving module 101 is further configured to receive, after the sending module 102 sends the migration request message to the access network device 200, a migration response message with which the access network device 200 replies according to the received migration request message.

Figure 3:
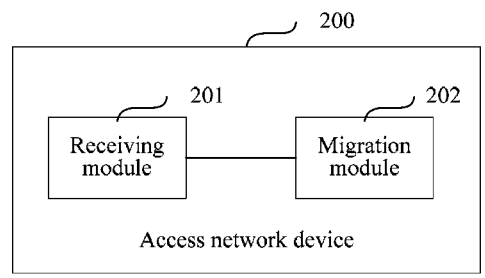
FIG. 3 is a schematic diagram of an access network device according to an embodiment of the present invention.
Figure 6:
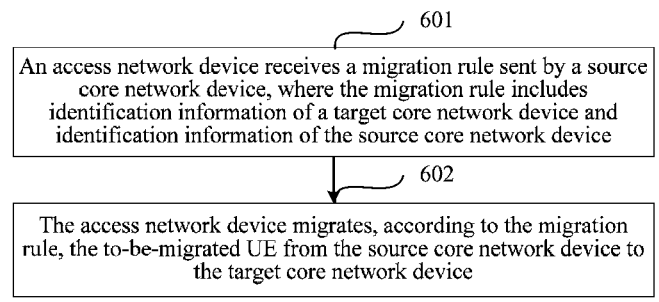
FIG. 6 is a flowchart of still another user equipment migration method according to an embodiment of the present invention.
Figure 7:
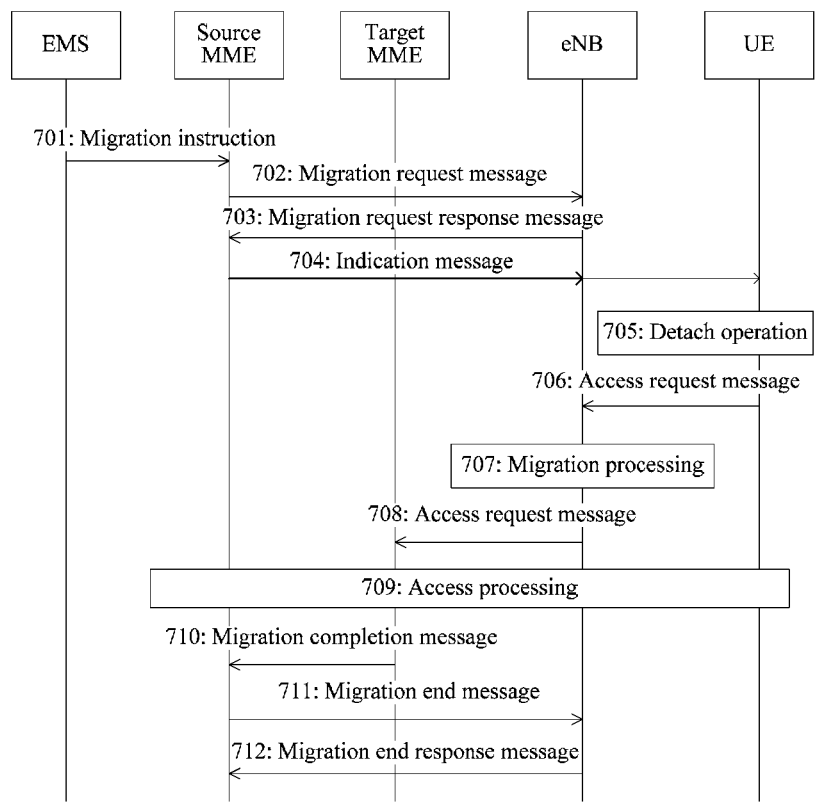
FIG. 7 is a schematic diagram of a user equipment migration process according to an embodiment of the present invention.

As shown in FIG. 3, an access network device 200 provided in an embodiment of the present invention may be specifically configured to perform a method shown in FIG. 6. The access network device 200 may include:

a receiving module 201, configured to receive a migration rule sent by a source core network device 100*a*, where the migration rule includes identification information of a target core network device 100*b* and identification information of the source core network device 100*a*; and a migration module 202, configured to migrate, according to the migration rule received by the receiving module 201, to-be-migrated UE from the source core network device 100*a* to the target core network device 100*b*.

Optionally, the receiving module 201 is further configured to receive, before the migration module 202 migrates, according to the migration rule, the to-be-migrated UE from the source core network device 100*a* to the target core network device 100*b*, an access request message sent by the to-be-migrated UE, where the access request message carries identification information of a core network device to which the to-be-migrated UE is connected; and the access network device 200 further includes:

a first determining module, configured to: if determining that the identification information of the core network device to which the to-be-migrated UE is connected and the identification information of the source core network device 100*a* are the same, instruct the migration module 202 to migrate, according to the migration rule received by the receiving module 201, the to-be-migrated UE from the source core network device 100a to the target core network device 100b.

Optionally, the migration rule further includes: a correspondence between the to-be-migrated UE and the target core network device 100b; or a correspondence between the source core network device 100a and the target core network device 100b.

Further, the access network device 200 further includes: a second determining module, configured to determine the target core network device 100b of the to-be-migrated UE according to the correspondence, where the migration module 202 is specifically configured to migrate the to-be-migrated UE to the target core network device 100b of the to-be-migrated UE that is determined by the second determining module.

Optionally, the migration rule further includes at least one of the following: a migration start time, a migration end time, or identification information of the to-be-migrated UE; and the migration module 202 is specifically configured to:

when the migration rule further includes the migration start time, and when the migration start time arrives, start to migrate the to-be-migrated UE from the source core network device 100a to the target core network device 100b; or when the migration rule further includes the migration end time, and when the migration end time arrives, stop migrating the to-be-migrated UE from the source core network device 100a to the target core network device 100b.

Optionally, the receiving module 201 is specifically configured to receive a migration request message sent by the source core network device 100a, where the migration request carries the migration rule; and the access network device 200 further includes:

a sending module, configured to send a migration request response message to the source core network device 100a, where the migration request response message is configured to indicate that the receiving module 201 successfully receives the migration request message.

Optionally, the access network device 200 further includes:

a third determining module, configured to determine whether the migrating the to-be-migrated UE from the source core network device 100a to the target core network device 100b is finished; and a clear module, configured to clear the migration rule if the third determining module determines that the migrating the to-be-migrated UE from the source core network device 100a to the target core network device 100b is finished.

Further, the third determining module is specifically configured to: if the receiving module 201 receives a migration end instruction sent by the target core network device 100b, determine that the migrating the to-be-migrated UE from the source core network device 100a to the target core network device 100b is finished; or if it is determined that a current time reaches the migration end time included in the migration rule, determine that the migrating the to-be-migrated UE from the source core network device 100a to the target core network device 100b is finished.

Figure 4:
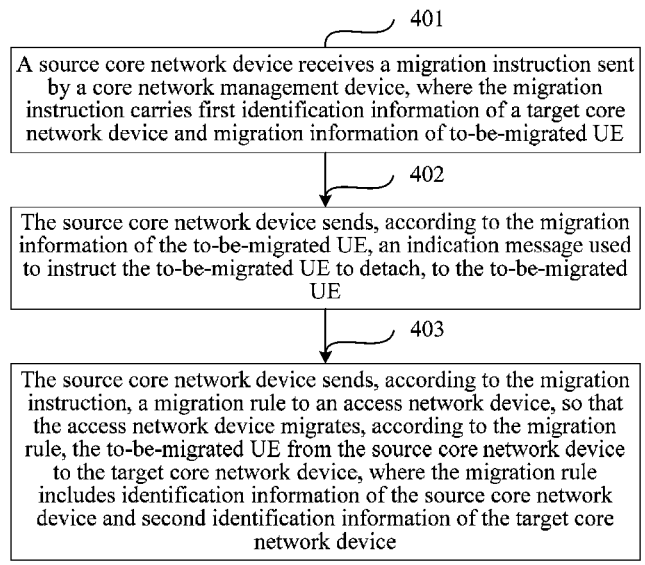
FIG. 4 is a flowchart of a user equipment migration method according to an embodiment of the present invention.

An embodiment of the present invention provides a user equipment migration method. As shown in FIG. 4, the method is performed by a source core network device, and includes the following steps:

Step 401: The source core network device receives a migration instruction sent by a core network management device, where the migration instruction carries first identification information of a target core network device and migration information of to-be-migrated UE.

The core network management device may be an EMS, or may be another device that is configured to manage a core network device and that is other than an element management system. This is not specifically limited in this embodiment of the present invention. In addition, the core network management device may include one or more network devices.

Specifically, the migration instruction may be sent to the source core network device by using a newly constructed S1 interface message or by expanding an existing S1 interface message.

The migration information of the to-be-migrated UE may include at least one of the following: a quantity of the to-be-migrated UEs, a percentage of the quantity of the to-be-migrated UEs in a total quantity of all UEs accessing the source core network device, a percentage of the quantity of the to-be-migrated UEs in a quantity of UEs accessing a base station to which the to-be-migrated UEs belong, identification information of the base station to which the to-be-migrated UEs belong, or identification information of the to-be-migrated UEs.

Specifically, the identification information of the to-be-migrated UE is used to indicate the to-be-migrated UE, and may be an IMSI of the to-be-migrated UE, an MSISDN of the to-be-migrated UE, a level of the to-be-migrated UE, a type of the to-be-migrated UE, subscription information the to-be-migrated UE, or the like.

Optionally, the migration instruction may further include at least one of the following: a migration start time, a migration end time, a migration speed, or identification information of the to-be-migrated UE. The migration start time is used to instruct the access network device to start to migrate the to-be-migrated UE when the migration start time arrives; the migration end time is used to instruct the access network device to stop migrating the to-be-migrated UE when the migration end time arrives; and the identification information of the to-be-migrated UE is used to indicate the to-be-migrated UE.

Further, the migration instruction may further include: a correspondence between the to-be-migrated UE and the target core network device; or, a correspondence between the source core network device and the target core network device. Specifically, the correspondence may be stored in form of a table, or may be stored by associating identification information of to-be-migrated UE with identification information of each target core network device, or the like.

For example, when a quantity of the target core network devices is greater than or equal to 2, and a quantity of the to-be-migrated UEs is also greater than or equal to 2, the correspondence between the to-be-migrated UEs and the target core network devices may be a correspondence between a quantity of the to-be-migrated UEs to be migrated to the target core network devices and the target core network devices, or may be a correspondence between identification information of the to-be-migrated UEs to be migrated to the target core network devices and the target core network devices. This is not limited herein.

Step 402: The source core network device sends, according to the migration information of the to-be-migrated UE, an indication message used to instruct the to-be-migrated UE to detach, to the to-be-migrated UE.

The indication message used to instruct the to-be-migrated UE to detach may be a detach message, or may be a UE context release command message, or the like.

The migration instruction may further include a migration speed. The migration speed is used to instruct the source core network device to send, the indication message used to instruct the to-be-migrated UE to detach, to the access network device at the migration speed.

Step 403: The source core network device sends a migration rule to an access network device according to the migration instruction, so that the access network device migrates, according to the migration rule, the to-be-migrated UE from the source core network device to the target core network device, where the migration rule includes identification information of the source core network device and second identification information of the target core network device.

Specifically, when the source core network device sends the migration rule to each base station that is accessing the source core network device, the source core network device carries the migration rule in a migration request message and sends the migration rule to each base station that is accessing the source core network device.

It should be noted that, the second identification information of the target core network device and the first identification information of the target core network device may be the same, or may be different. For example, the second identification information may be obtained according to the first identification information of the target core network device. This is not limited herein.

Optionally, the migration rule may further include at least one of the following: a migration start time, a migration end time, or identification information of the to-be-migrated UE; and the migration start time is used to instruct the access network device to start to migrate the to-be-migrated UE when the migration start time arrives; the migration end time is used to instruct the access network device to stop migrating the to-be-migrated UE when the migration end time arrives; and the identification information of the to-be-migrated UE is used to indicate the to-be-migrated UE. Specifically, the migration start time and the migration end time may both be determined by the source core network device, or may be sent to the source core network device by using the migration instruction by the core network management device in step 401.

Further, the migration rule may further include the correspondence between the to-be-migrated UE and the target core network device or the correspondence between the source core network device and the target core network device in step 401. The correspondence may be stored in form of a table, or may be stored by associating identification information of to-be-migrated UE with identification information of each target core network device, or the like. This is not limited herein.

It should be noted that, the foregoing step 402 and step 403 are performed in no particular order. That is, step 402 may be first performed, or step 403 may be first performed.

In the solution provided in the foregoing embodiment, a management system sends a migration instruction to a source core network device, to provide migration information of to-be-migrated UE and identification information of a target core network device; the source core network device generates a migration rule according to the migration instruction, and sends the migration rule to an access network device, thereby implementing flexible designation of the to-be-migrated UE and the target core network device, and further implementing flexible migration of the UE between the core network devices.

It should be noted that, the source core network device involved in this embodiment of the present invention may be an MME or an SGSN, the target core network device may also be an MME or an SGSN, and the access network device may be a base station or a base station control device, for example, a BSC or an RNC.

Figure 5:
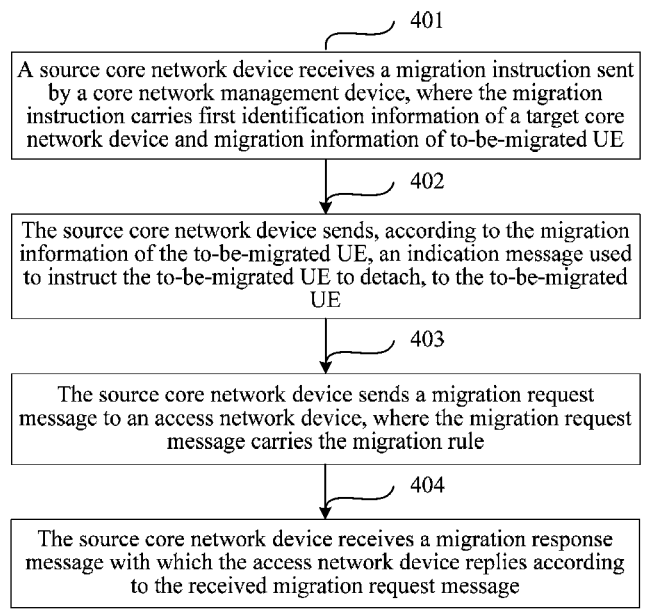
FIG. 5 is a flowchart of another user equipment migration method according to an embodiment of the present invention.

Optionally, in an implementation scenario of the foregoing embodiment, in step 403, as shown in FIG. 5, the sending, by the source core network device, a migration rule to an access network device according to the migration instruction may specifically include:

sending, by the source core network device, a migration request message to the access network device, where the migration request carries the migration rule.

Further, after the source core network device sends the migration request message to the access network device, as shown in FIG. 5, the method may further include:

Step 404: The source core network device receives a migration response message with which the access network device replies according to the received migration request message.

Optionally, in another implementation scenario of the foregoing embodiment, in step 402, the sending, by the source core network device according to the migration information of the to-be-migrated UE, an indication message used to instruct the to-be-migrated UE to detach, to the to-be-migrated UE may specifically include:

when the migration information includes a quantity of the to-be-migrated UEs, selecting, by the source core network device according to the quantity of the to-be-migrated UEs, a corresponding quantity of UEs from all UEs accessing the source core network device, as the to-be-migrated UEs; or, when the migration information includes a percentage of the quantity of the to-be-migrated UEs in a total quantity of all the UEs accessing the source core network device, selecting, by the source core network device according to the percentage, UEs corresponding to the percentage from all the UEs accessing the source core network device, as the to-be-migrated UEs; or, when the migration information includes identification information of a base station to which the to-be-migrated UEs belong, selecting all the UEs accessing the base station to which the to-be-migrated UEs belong, as the to-be-migrated UEs; and sending, by the source core network device, the indication message to the to-be-migrated UEs.

An embodiment of the present invention further provides a user equipment migration method. The method is performed by an access network device. As shown in FIG. 6, the method includes the following steps:

Step 601: The access network device receives a migration rule sent by a source core network device, where the migration rule includes identification information of a target core network device and identification information of the source core network device.

The migration rule may further include at least one of the following: a migration start time, a migration end time, or identification information of the to-be-migrated UE. The migration start time may be used to instruct the access network device to start to migrate the to-be-migrated UE when the migration start time arrives; the migration end time may be used to instruct the access network device to stop migrating the to-be-migrated UE when the migration end time arrives; and the identification information of the to-be-migrated UE may be used to indicate the to-be-migrated UE.

Further, the migration rule may further include the correspondence between the to-be-migrated UE and the target core network device or the correspondence between the source core network device and the target core network device in step 401. The correspondence may be stored in form of a table, or may be stored by associating identification information of to-be-migrated UE with identification information of each target core network device, or the like. This is not limited herein.

The migration rule may be carried in a migration request message, and may be generated by the source core network device.

Step 602: The access network device migrates, according to the migration rule, the to-be-migrated UE from the source core network device to the target core network device.

It should be noted that, the source core network device involved in this embodiment of the present invention may be an MME or an SGSN, the target core network device may also be an MME or an SGSN, and the access network device may be a base station or a base station control device, for example, a BSC or an RNC.

In the solution provided in the foregoing embodiment, an access network device receives a migration rule sent by a source core network device, obtains identification information of to-be-migrated UE and identification information of a target core network device, and migrates the to-be-migrated UE according to the migration rule, thereby implementing flexible migration of the UE between the core network devices.

Optionally, in an embodiment scenario of the foregoing embodiment, step 601 may include:

receiving, by the access network device, a migration request message sent by the source core network device, where the migration request carries the migration rule.

After step 601, the foregoing method may further include:

sending, by the access network device, a migration request response message to the source core network device, where the migration request response message is used to indicate that the access network device successfully obtains the migration request message.

Optionally, in another embodiment scenario of the foregoing embodiment, before step 602, the foregoing method may further include:

Step 601a: The access network device receives an access request message sent by the to-be-migrated UE, where the access request message carries identification information of a core network device to which the to-be-migrated UE is connected.

Step 601b: If it is determined that the identification information of the core network device to which the to-be-migrated UE is connected and the identification information of the source core network device are the same, the access network device performs step 602.

Further, when the migration rule includes the identification information of the to-be-migrated UE, before step 601b, the method may further include:

obtaining, by the access network device after receiving an access request message of UE, identification information of the UE, and determining whether the UE is to-be-migrated UE according to identification information of the to-be-migrated UE that is included in the migration rule; and if yes, performing step 601b.

Optionally, in another implementation scenario of the foregoing embodiment, the migration rule may further include a migration start time and/or a migration end time. Step 602 may include:

when the migration rule further includes the migration start time, and when the migration start time arrives, starting, by the access network device, to migrate the to-be-migrated UE from the source core network device to the target core network device; or when the migration rule further includes the migration end time, and when the migration end time arrives, stopping, by the access network device, migrating the to-be-migrated UE from the source core network device to the target core network device.

Specifically, when the migration rule includes the migration end time, the migrating, by the access network device, the to-be-migrated UE from the source core network device to the target core network device may be specifically implemented in the following manner:

determining, by the access network device after receiving an access request message sent by UE, whether identification information of the UE matches identification information of to-be-migrated UE; and if yes, determining that the UE is to-be-migrated UE; when the identification information of the core network device to which the to-be-migrated UE is connected is the same as the identification information of the source core network device that is included in the migration rule carried in the migration request message, if determining that a time at which migration is performed does not reach the migration end time, migrating, by the access network device according to the migration rule carried in the migration request message, the to-be-migrated UE from the source core network device to the target core network device; and if determining that the time at which migration is performed reaches the migration end time, stopping, by the access network device, migrating the to-be-migrated UE from the source core network device to the target core network device.

Optionally, in another embodiment scenario of the foregoing embodiment, when the migration rule further includes the correspondence between the to-be-migrated UE and the target core network device, in step 602, the migrating, according to the migration rule, the to-be-migrated UE from the source core network device to the target core network device may include:

determining, by the access network device, the target core network device of the to-be-migrated UE according to the correspondence between the to-be-migrated UE and the target core network device, or the correspondence between the source core network device and the target core network device; and migrating the to-be-migrated UE to the target core network device of the to-be-migrated UE.

Optionally, in still another implementation scenario of the foregoing embodiment, after step 602, the method further includes:

if the access network device determines that the migrating the to-be-migrated UE from the source core network device to the target core network device is finished, clearing the migration rule.

The determining, by the access network device, that the migrating the to-be-migrated UE from the source core network device to the target core network device is specifically implemented in the following two manners:

first implementation manner:

if the access network device receives a migration end instruction sent by the target core network device, determining, by the access network device, that the migrating the to-be-migrated UE from the source core network device to the target core network device is finished; or second implementation manner:

if a current time reaches the migration end time included in the migration rule, determining, by the access network device, that the migrating the to-be-migrated UE from the source core network device to the target core network device is finished.

Figure 9:
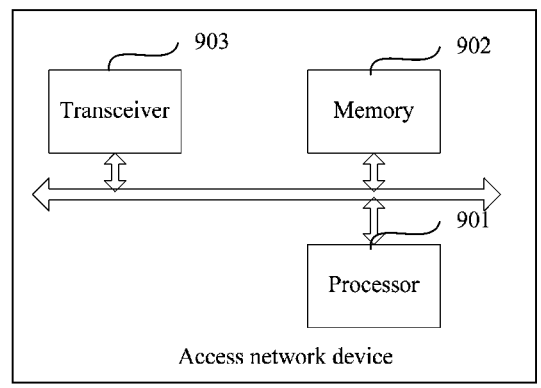
FIG. 9 is a schematic diagram of another access network device according to an embodiment of the present invention.

As shown in FIG. 9, an embodiment of the present invention further provides another user equipment migration method.

Step 701: An EMS determines migration information of to-be-migrated UE and first identification information of a target core network device, and sends a migration instruction to a source core network device.

The migration instruction may include: the migration information of the to-be-migrated UE, and the first identification information of the target core network device. The migration instruction may further include at least one of the following: a migration start time, a migration end time, or identification information of the to-be-migrated UE. The migration instruction may be a new S1 interface message, or may be carried in an original S1 interface message.

The migration start time is used to instruct the access network device to start to migrate the to-be-migrated UE when the migration start time arrives; the migration end time is used to instruct the access network device to stop migrating the to-be-migrated UE when the migration end time arrives; and the identification information of the to-be-migrated UE is used to indicate the to-be-migrated UE.

Specifically, refer to the related description in the embodiment shown in FIG. 2 for the migration information of the to-be-migrated UE, and details are not described herein again.

Optionally, step 701 may specifically include:

allocating to-be-migrated UEs to at least two source core network devices according to a preset proportion, that is, allocating a quantity of to-be-migrated UEs to each source core network device; and sending a migration instruction to the at least two source core network devices.

If a source core network device is designated by using a human-machine interface input device, and there is only one designated source core network device, there is no need to perform division. In this embodiment of the present invention, there is one designated source core network device.

Step 702: The source core network device sends a migration rule to an eNB according to the migration instruction.

Specifically, the migration information of the to-be-migrated UE, the identification information of the target core network device, a migration start time, and a migration end time may be obtained from the migration instruction. To-be-migrated UE is selected according to the migration information of the to-be-migrated UE. For example, to reduce service loss, a user in an idle state may be selected. A specific selection manner may be a selection manner provided in the conventional art, and is not specifically limited in this embodiment of the present invention.

The source core network device may send, by using a migration request message, the migration rule to an eNB accessing the source core network device, and specifically, the source core network device may send, by using a migration request message, the migration rule to one or more eNBs accessing the source core network device.

The migration rule may include identification information of the source core network device and second identification information of the target core network device, and may further include at least one of: the identification information of the to-be-migrated UE, the migration start time, or the migration end time.

It should be noted that, the first identification information and the second identification information may be the same, or may be different. This is not limited herein.

Step 703: The eNB receives a migration request message, obtains the migration rule, and sends a migration request response message to the source core network device.

The migration request response message is used to indicate that the eNB successfully obtains the migration rule.

Step 704: After receiving the migration request response message, the source core network device sends, according to the migration information of the to-be-migrated UE, an indication message used to instruct the to-be-migrated UE to detach.

Specifically, the indication message may be a detach message, or a "UE context release command" message.

Specifically, step 704 may be implemented in the following manner:

a: when the migration information includes a quantity of the to-be-migrated UEs, selecting, by the source core network device according to the quantity of the to-be-migrated UEs, a corresponding quantity of UEs from all UEs accessing the source core network device, as the to-be-migrated UEs; or, when the migration information includes a percentage of the quantity of the to-be-migrated UEs in a total quantity of all the UEs accessing the source core network device, selecting, by the source core network device according to the percentage, UEs corresponding to the percentage from all the UEs accessing the source core network device, as the to-be-migrated UEs; or, when the migration information includes identification information of a base station to which the to-be-migrated UEs belong, selecting all the UEs accessing the base station to which the to-be-migrated UEs belong, as the to-be-migrated UEs; and b: sending, by the source core network device, the indication message to the to-be-migrated UEs.

Step 705: The to-be-migrated UE receives the indication message, and performs a detach operation.

Step 706: The to-be-migrated UE sends an access request message to the eNB, where the access request message carries identification information of a core network device to which the to-be-migrated UE is connected.

The access request message may be an attach message, or may be a TAU, or the like.

Step 707: The eNB performs migration processing after receiving the access request message.

The migration processing may be specifically implemented in the following manner:

obtaining identification information of a core network device to which the to-be-migrated UE is currently connected; performing matching between the identification information of the core network device to which the to-be-migrated UE is currently connected and the identification information of the source core network device that is included in the stored migration rule; and if the obtained identification information of the core network device to which the to-be-migrated UE is connected is the same as the identification information of the source core network device that is included in the stored migration rule after the matching, redirecting the access request message of the to-be-migrated UE to the target core network device.

Optionally, before the redirecting the access request message of the to-be-migrated UE to the target core network device, the method further includes: determining that the migration start time is reached and the migration end time is not reached.

Step 708: The target core network device receives the access request message sent by the eNB.

Step 709: After receiving the access request message, the target core network device performs access processing on the to-be-migrated UE, where a specific processing manner may be a manner provided in the conventional art, and details are not described in this embodiment of the present invention.

Step 710: After finishing the access processing on the to-be-migrated UE, the target core network device sends, to the source core network device, a migration completion message indicating that the migration is finished.

Step 711: After receiving the migration completion message, the source core network device sends a migration end instruction to the eNB.

Step 712: When receiving the migration end instruction or determining that the migration end time is reached, the eNB clears the stored migration rule, and sends a migration end response message to the source core network device.

Figure 8:
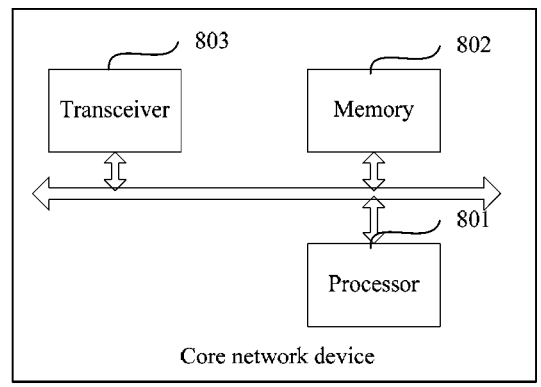
FIG. 8 is a schematic diagram of another core network device according to an embodiment of the present invention.

An embodiment of the present invention further provides a core network device. The core network device may be configured to perform the method shown in FIG. 4 or FIG. 5, and specifically includes a processor 801, a memory 802, and a transceiver 803. The processor 801 is separately accessing the memory 802 and the transceiver 803. This embodiment of the present invention does not limit a specific connection medium between the foregoing components. In this embodiment of the present invention, in FIG. 8, the memory 802, the processor 801, and the transceiver 803 are connected by using a bus. In FIG. 8, bold lines represent the bus. Connection manners between other components are merely schematically described, and are not limited.

The memory 802 in this embodiment of the present invention is configured to store program code executed by the processor 801, and may be a read-only memory (ROM), a random-access memory (RAM), an electrically erasable programmable read-only memory (EEPROM), a disk storage medium or another disk storage device, or any other medium that can be configured to carry or store expected program code having an instruction or data structure form and that can be accessed by a computer, but is not limited to this. For example, the memory 802 may be a combination of the foregoing memories.

The transceiver 803 receives a migration instruction sent by a core network management device, where the migration instruction carries first identification information of a target core network device and migration information of to-be-migrated UE.

The transceiver 803 sends, according to the migration information of the to-be-migrated UE, an indication message used to instruct the to-be-migrated UE to detach, to the to-be-migrated UE.

The transceiver 803 sends a migration rule to an access network device according to the migration instruction, so that the access network device migrates, according to the migration rule, the to-be-migrated UE from the source core network device to the target core network device, where the migration rule includes identification information of the source core network device and second identification information of the target core network device.

The migration instruction received by the transceiver 803 may further include a correspondence between the to-be-migrated UE and the target core network device, or a correspondence between the source core network device and the target core network device. Then the processor 801 obtains, from the migration instruction, the correspondence between the to-be-migrated UE and the target core network device, or the correspondence between the source core network device and the target core network device; and generates a migration rule including the correspondence and sends the migration rule to the access network device.

Optionally, the processor 801 does not obtain, from the migration instruction, the correspondence between the to-be-migrated UE and the target core network device, or the correspondence between the source core network device and the target core network device. Instead, the processor 801 determines the correspondence between the to-be-migrated UE and the target core network device, or the correspondence between the source core network device and the target core network device, generates, after the determining, a migration rule including the correspondence and sends the migration rule to the access network device.

The migration information received by the transceiver 803 includes at least one of the following: a quantity of the to-be-migrated UEs, a percentage of the quantity of the to-be-migrated UEs in a total quantity of all UEs accessing the source core network device, a percentage of the quantity of the to-be-migrated UEs in a quantity of UEs accessing a base station to which the to-be-migrated UEs belong, identification information of the base station to which the to-be-migrated UEs belong, or identification information of the to-be-migrated UEs.

Specifically, when the migration information includes the quantity of the to-be-migrated UEs, the processor 801 selects, according to the quantity of the to-be-migrated UEs, a corresponding quantity of UEs from all the UEs accessing the source core network device, as the to-be-migrated UEs; or, when the migration information includes the percentage of the quantity of the to-be-migrated UEs in the total quantity of all the UEs accessing the source core network device, the processor 801 selects, according to the percentage, UEs corresponding to the percentage from all the UEs accessing the source core network device, as the to-be-migrated UEs; or, when the migration information includes the identification information of the base station to which the to-be-migrated UEs belong, the processor 801 selects all the UEs accessing the base station to which the to-be-migrated UEs belong, as the to-be-migrated UEs; and the transceiver 803 sends the indication message to the to-be-migrated UEs determined by the processor 801.

The processor 801 may further include, in the generated migration rule, at least one of the following: a migration start time, a migration end time, or identification information of the to-be-migrated UE; and the migration start time is used to instruct the access network device to start to migrate the to-be-migrated UE when the migration start time arrives; the migration end time is used to instruct the access network device to stop migrating the to-be-migrated UE when the migration end time arrives; and the identification information of the to-be-migrated UE is used to indicate the to-be-migrated UE.

Optionally, the transceiver 803 sends a migration request message to the access network device, where the migration request carries the migration rule.

Further, the transceiver 803 receives, after sending the migration request message to the access network device, a migration response message with which the access network device replies according to the received migration request message.

In the solution provided in the foregoing embodiment, the management system sends a migration instruction to the source core network device, to provide migration information of the to-be-migrated UE and identification information of the target core network device, and the source core network device generates a migration rule according to the migration instruction, and sends the migration rule to the access network device, thereby implementing flexible designation of the to-be-migrated UE and the target core network device, and further implementing flexible migration of the UE between the core network devices.

An embodiment of the present invention further provides an access network device. The access network device may be configured to perform the method shown in FIG. 6, and may specifically include a processor 901, a memory 902, and a transceiver 903. The processor 901 is separately accessing the memory 902 and the transceiver 903. This embodiment of the present invention does not limit a specific connection medium between the foregoing components. In this embodiment of the present invention, in FIG. 9, the memory 902, the processor 901, and the transceiver 903 are connected by using a bus. In FIG. 9, bold lines represent the bus. Connection manners between other components are merely schematically described, and are not limited.

The memory 902 in this embodiment of the present invention is configured to store program code executed by the processor 901, may be a ROM, a RAM, an EEPROM, a disk storage medium or another disk storage device, or any other medium that can be configured to carry or store expected program code having an instruction or data structure form and that can be accessed by a computer, but is not limited to this. For example, the memory 902 may be a combination of the foregoing memories.

The transceiver 903 receives a migration rule sent by a source core network device, where the migration rule includes identification information of a target core network device and identification information of the source core network device.

The processor 901 migrates, according to the migration rule received by the transceiver 903, the to-be-migrated UE from the source core network device to the target core network device.

Optionally, before the processor 901 migrates, according to the migration rule, the to-be-migrated UE from the source core network device to the target core network device, the transceiver 903 receives an access request message sent by the to-be-migrated UE, where the access request message carries identification information of a core network device to which the to-be-migrated UE is connected; and if the processor 901 determines that the identification information of the core network device to which the to-be-migrated UE is connected and the identification information of the source core network device are the same, the access network device migrates, according to the migration rule, the to-be-migrated UE from the source core network device to the target core network device.

The migration rule sent by the processor 901 to the access network device further includes:

a correspondence between the to-be-migrated UE and the target core network device; or a correspondence between the source core network device and the target core network device.

Further, the migrating, by the processor 901 according to the migration rule, the to-be-migrated UE from the source core network device to the target core network device is specifically implemented in the following manner:

determining, by the access network device according to the correspondence, the target core network device of the to-be-migrated UE; and migrating the to-be-migrated UE to the target core network device of the to-be-migrated UE.

Optionally, when the migration rule further includes at least one of the following: a migration start time, a migration end time, or identification information of the to-be-migrated UE, the migrating, by the processor 901 according to the migration rule, the to-be-migrated UE from the source core network device to the target core network device may specifically include:

when the migration rule further includes the migration start time, and when the migration start time arrives, starting, by the processor 901, to migrate the to-be-migrated UE from the source core network device to the target core network device; or when the migration rule further includes the migration end time, and when the migration end time arrives, stopping, by the processor 901, migrating the to-be-migrated UE from the source core network device to the target core network device.

The receiving, by the transceiver 903, the migration rule sent by the source core network device may be specifically in the following manner:

receiving, by the transceiver 903, a migration request message sent by the source core network device, where the migration request carries the migration rule; and sending, by the transceiver 903 after receiving the migration request message, a migration request response message to the source core network device, where the migration request response message is used to indicate that the access network device successfully obtains the migration request message.

Optionally, if determining that the migrating the to-be-migrated UE from the source core network device to the target core network device is finished, the processor 901 clears the migration rule.

Further, the processor 901 may determine, in the following manner, that the migrating the to-be-migrated UE from the source core network device to the target core network device is finished:

if the transceiver 903 receives a migration end instruction sent by the target core network device, determining, by the processor 901 that the migrating the to-be-migrated UE from the source core network device to the target core network device is finished; or if a current time reaches the migration end time included in the migration rule, determining, by the processor 901, that the migrating the to-be-migrated UE from the source core network device to the target core network device is finished.

In the solution provided in the foregoing embodiment, the access network device receives a migration rule sent by the source core network device, obtains identification information of the to-be-migrated UE and identification information of the target core network device, and migrates the to-be-migrated UE according to the migration rule, thereby implementing flexible migration of the UE between the core network devices.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A core network device, comprising:
a processor; and
a memory coupled to the processor, wherein the memory stores processor-readable instructions which when executed cause the processor to implement operations including:
receiving a migration instruction sent by a core network management device, wherein the migration instruction carries first identification information of a target core network device and migration information of a to-be-migrated user equipment (UE);
sending to the to-be-migrated UE an indication message, according to the migration information of the to-be-migrated UE, wherein the indication message is used to instruct the to-be-migrated UE to detach; and
sending a migration rule to an access network device according to the migration instruction, so that an access network device migrates, according to the migration rule, the to-be-migrated UE from a source core network device to the target core network device, wherein the migration rule comprises identification information of the source core network device and second identification information of the target core network device.

2. The core network device according to claim 1, wherein the migration information comprises at least one of the following: a quantity of to-be-migrated UEs, a percentage of the quantity of the to-be-migrated UEs in a total quantity of all UEs accessing the source core network device, a percentage of the quantity of the to-be-migrated UEs in a quantity of UEs accessing a base station to which the to-be-migrated UEs belong, identification information of the base station to which the to-be-migrated UEs belong, and identification information of the to-be-migrated UEs.

3. The core network device according to claim 2, wherein the operations include:
when the migration information comprises the quantity of the to-be-migrated UEs, selecting, according to the quantity of the to-be-migrated UEs, a corresponding quantity of UEs from all the UEs accessing the source core network device, as the to-be-migrated UEs; and
sending the indication message to the to-be-migrated UEs.

4. The core network device according to claim 2, wherein the operations include:
when the migration information comprises the percentage of the quantity of the to-be-migrated UEs in the total quantity of all the UEs accessing the source core network device, selecting, according to the percentage, UEs corresponding to the percentage from all the UEs accessing the source core network device, as the to-be-migrated UEs;
sending the indication message to the to-be-migrated UEs.

5. The core network device according to claim 2, wherein the operations include:
when the migration information comprises the identification information of the base station to which the to-be-migrated UEs belong, selecting all the UEs accessing the base station to which the to-be-migrated UEs belong, as the to-be-migrated UE; and
sending the indication message to the to-be-migrated UEs.

6. The core network device according to claim 1, wherein the migration rule further comprises at least one of the following: a migration start time, a migration end time, and the identification information of the to-be-migrated UE, wherein
the migration start time is used to instruct the access network device to start to migrate the to-be-migrated UE when the migration start time arrives; the migration end time is used to instruct the access network device to stop migrating the to-be-migrated UE when the migration end time arrives; and the identification information of the to-be-migrated UE is used to indicate the to-be-migrated UE.

7. The core network device according to claim 1, wherein the migration instruction further comprises a migration speed; and the operations include:
sending, according to the migration information of the to-be-migrated UE, the indication message to the to-be-migrated UE at the migration speed.

8. An access network device, comprising:
a processor; and
a memory coupled to the processor, wherein the memory stores processor-readable instructions which when executed cause the processor to implement operations including:
receiving a migration rule sent by a source core network device, wherein the migration rule comprises identification information of a target core network device and identification information of the source core network device; and migrating, according to the migration rule, a to-be-migrated user equipment (UE) from the source core network device to the target core network device, wherein the operations also include:
receiving an access request message sent by the to-be-migrated UE before the to-be-migrated UE is migrated from the source core network device to the target core network device, wherein the access request message carries identification information of a core network device to which the to-be-migrated UE is connected; and when determining that the identification information of the core network device to which the to-be-migrated UE is connected and the identification information of the source core network device are the same, migrating, according to the migration rule received by the receiving module, the to-be-migrated UE from the source core network device to the target core network device.

9. The access network device according to claim 8, wherein the migration rule further comprises a migration start time; and the operations include:
when the migration start time arrives, starting to migrate the to-be-migrated UE from the source core network device to the target core network device.

10. A user equipment migration method, comprising:
receiving, by a source core network device, a migration instruction sent by a core network management device, wherein the migration instruction carries first identification information of a target core network device and migration information of a to-be-migrated user equipment (UE);

sending, by the source core network device, an indication message to the to-be-migrated UE according to the migration information, wherein the indication message used to instruct the to-be-migrated UE to detach; and sending, by the source core network device, a migration rule to an access network device according to the migration instruction, so that the access network device migrates, according to the migration rule, the to-be-migrated UE from the source core network device to the target core network device, wherein the migration rule comprises identification information of the source core network device and second identification information of the target core network device.

11. The method according to claim 10, wherein the migration information comprises at least one of the following: a quantity of to-be-migrated UEs, a percentage of the quantity of the to-be-migrated UEs in a total quantity of all UEs accessing the source core network device, a percentage of the quantity of the to-be-migrated UEs in a quantity of UEs accessing a base station to which the to-be-migrated UEs belong, identification information of the base station to which the to-be-migrated UEs belong, and identification information of the to-be-migrated UEs.

12. The method according to claim 11, wherein the sending the indication message to the to-be-migrated UE comprises:
when the migration information comprises the quantity of the to-be-migrated UEs, selecting, according to the quantity of the to-be-migrated UEs, a corresponding quantity of UEs from all the UEs accessing the source core network device, as the to-be-migrated UEs; and sending the indication message to the to-be-migrated UEs.

13. The method according to claim 11, wherein the sending the indication message to the to-be-migrated UE comprises:
when the migration information comprises the percentage of the quantity of the to-be-migrated UEs in the total quantity of all the UEs accessing the source core network device, selecting, according to the percentage, UEs corresponding to the percentage from all the UEs accessing the source core network device, as the to-be-migrated UEs; and sending the indication message to the to-be-migrated UEs.

14. The method according to claim 11, wherein the sending the indication message to the to-be-migrated UE comprises:
when the migration information comprises the identification information of the base station to which the to-be-migrated UEs belong, selecting all the UEs accessing the base station to which the to-be-migrated UEs belong, as the to-be-migrated UEs; and sending the indication message to the to-be-migrated UEs.

15. The method according to claim 10, wherein the migration rule further comprises at least one of the following: a migration start time, a migration end time, or identification information of the to-be-migrated UE; and
the migration start time is used to instruct the access network device to start to migrate the to-be-migrated UE when the migration start time arrives; the migration end time is used to instruct the access network device to stop migrating the to-be-migrated UE when the migration end time arrives; and the identification information of the to-be-migrated UE is used to indicate the to-be-migrated UE.

16. The method according to claim 10, wherein the migration instruction further comprises a migration speed; and
wherein the sending the indication message to the to-be-migrated UE comprises:
sending, by the source core network device according to the migration information of the to-be-migrated UE, the indication message to the to-be-migrated UE at the migration speed.

17. A user equipment migration method, comprising:
receiving, by an access network device, a migration rule sent by a source core network device, wherein the migration rule comprises identification information of a target core network device and identification information of the source core network device; and migrating, by the access network device according to the migration rule, a to-be-migrated user equipment (UE) from the source core network device to the target core network device, wherein before the migrating the to-be-migrated UE from the source core network device to the target core network device, and wherein the method further comprises:
receiving, by the access network device, an access request message sent by the to-be-migrated UE, wherein the access request message carries identification information of a core network device to which the to-be-migrated UE is connected; and when it is determined that the identification information of the core network device to which the to-be-migrated UE is connected and the identification information of the source core network device are the same, migrating, by the access network device according to the migration rule, the to-be-migrated UE from the source core network device to the target core network device.

18. The method according to claim 17, wherein the migration rule further comprises a migration start time; and
wherein the migrating the to-be-migrated UE from the source core network device to the target core network device comprises:
when the migration start time arrives, starting, by the access network device, to migrate the to-be-migrated UE from the source core network device to the target core network device.

* * * * *